US009980040B2

(12) United States Patent
Whyte et al.

(10) Patent No.: US 9,980,040 B2
(45) Date of Patent: *May 22, 2018

(54) ACTIVE SPEAKER LOCATION DETECTION

(71) Applicant: Microsoft Technology Licensing, LLC, Redmond, WA (US)

(72) Inventors: Oliver Arthur Whyte, Cambridge, MA (US); Ross Cutler, Clyde Hill, WA (US); Avronil Bhattacharjee, Redmond, WA (US); Adarsh Prakash Murthy Kowdle, Redmond, WA (US); Adam Kirk, Seattle, WA (US); Stanley T. Birchfield, Sammamish, WA (US); Cha Zhang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/441,793

(22) Filed: Feb. 24, 2017

(65) Prior Publication Data

US 2017/0201825 A1    Jul. 13, 2017

Related U.S. Application Data

(63) Continuation of application No. 14/991,847, filed on Jan. 8, 2016, now Pat. No. 9,621,795.

(51) Int. Cl.
*H04N 7/15* (2006.01)
*H04R 1/40* (2006.01)
*H04N 7/14* (2006.01)

(52) U.S. Cl.
CPC ............. *H04R 1/406* (2013.01); *H04N 7/142* (2013.01); *H04N 7/15* (2013.01)

(58) Field of Classification Search
CPC .......... H04N 7/15; H04N 7/142; H04N 7/147; H04N 7/18; H04N 5/23258; H04R 3/005; H04R 1/406; H04R 6/027; H04R 2420/07
(Continued)

(56) References Cited

U.S. PATENT DOCUMENTS 5,335,011 A    8/1994  Addeo et al.
6,285,392 B1   9/2001  Satoda et al.
(Continued)

OTHER PUBLICATIONS

Wang, H. et al., "Voice Source Localization for Automatic Camera Pointing System in Videoconferencing", In Proceedings of the IEEE International Conference on Acoustics, Speech, and Signal Processing, vol. 1, Apr. 21, 1997, 4 pages.
(Continued)

*Primary Examiner* — Melur Ramakrishnaiah
(74) *Attorney, Agent, or Firm* — Alleman Hall Creasman & Tuttle LLP

(57) ABSTRACT

Various examples related to determining a location of an active participant are provided. In one example, image data of a room from an image capture device is received. First audio data from a first microphone array at the image capture device is received. Second audio data from a second microphone array spaced from the image capture device is received. Using a three dimensional model, a location of the second microphone array is determined. Using the first audio data, second audio data, location of the second microphone array, and an angular orientation of the second microphone array, an estimated location of the active participant is determined.

20 Claims, 8 Drawing Sheets

(58) Field of Classification Search
USPC ....... 348/14.08–14.16; 381/92, 122, 58, 94.7
See application file for complete search history.

(56) References Cited

U.S. PATENT DOCUMENTS

| | | | |
|---|---|---|---|
| 6,826,284 | B1 | 11/2004 | Benesty et al. |
| 7,113,201 | B1 | 9/2006 | Taylor et al. |
| 8,314,829 | B2 | 11/2012 | Cutler |
| 8,315,366 | B2 | 11/2012 | Basart et al. |
| 8,717,402 | B2 | 5/2014 | Cutler |
| 9,071,895 | B2 * | 6/2015 | Cutler .................... H04N 7/142 |
| 2003/0118200 | A1 | 6/2003 | Beaucoup et al. |
| 2003/0220971 | A1 | 11/2003 | Kressin |
| 2005/0140779 | A1 | 6/2005 | Schulz et al. |
| 2005/0262201 | A1* | 11/2005 | Rudolph ............. H04L 12/1827 709/205 |
| 2006/0075422 | A1 | 4/2006 | Choi et al. |
| 2009/0322915 | A1 | 12/2009 | Cutler |
| 2009/0323981 | A1 | 12/2009 | Cutler |
| 2010/0150360 | A1 | 6/2010 | Beaucoup |
| 2011/0164141 | A1 | 7/2011 | Tico et al. |
| 2012/0038627 | A1 | 2/2012 | Sung et al. |
| 2012/0262536 | A1 | 10/2012 | Chen et al. |
| 2014/0133665 | A1 | 5/2014 | Xiang et al. |
| 2014/0205270 | A1* | 7/2014 | Kelly ................... G11B 27/031 386/285 |

OTHER PUBLICATIONS

Busso, C. et al., "Smart Room: Participant and Speaker Localization and Identification", In Proceedings of IEEE International Conference on Acoustics, Speech, and Signal Processing, vol. 2, Mar. 18, 2005, 4 pages.

Zhang, C. et al., "Boosting-Based Multimodal Speaker Detection for Distributed Meeting Videos", In IEEE Transaction on Multimedia, vol. 10, Issue 8, Dec. 2008, 10 pages.

Marti, A. et al., "Real Time Speaker Localization and Detection System for Camera Steering in Multiparticipant Videoconferencing Environments", In IEEE International Conference on Acoustics, Speech and Signal Processing, May 22, 2011, 4 pages.

Mansoori, et al., "Solving Infinite-Horizon Optimal Control Problems Using Haar Wavelet Collocation Method", In The Australian & New Zealand Industrial & Applied Mathematics Journal, Mar. 18, 2014, 5 pages.

Kozielski, C. et al., "Online Speaker Recognition for Teleconferencing Systems", In Technical Report, Technical University of Munich, Apr. 14, 2014, 67 pages.

Minotto, V. et al., "Simultaneous-Speaker Voice Activity Detection and Localization Using Mid-Fusion of SVM and HMMs", In Proceedings of IEEE Transactions on Multimedia, vol. 16, Issue 4, Jun. 2014, 13 pages.

"Microsoft RoundTable", Wikipedia website, Available online at https://en.wikipedia.org/wiki/Microsoft_RoundTable, Available as early as Feb. 16, 2008, 2 pages.

United States Patent and Trademark Office, Notice of Allowance issued in U.S. Appl. No. 14/991,847, dated Nov. 29, 2016, 11 pages.

ISA European Patent Office, International Search Report and Written Opinion issued in PCT Application No. PCT/US2016/068612, dated Mar. 16, 2017, WIPO, 13 pages.

"Second Written Opinion Issued in PCT Application No. PCT/US2016/068612", dated Nov. 15, 2017, 5 Pages.

* cited by examiner

FIG. 7B (FROM FIG. 7A)

↓

WHERE IMAGE DATA COMPRISES SIGNALS CORRESPONDING TO LIGHT EMITTED FROM PLURALITY OF LIGHT SOURCES OF SECOND MICROPHONE ARRAY, USE SIGNALS TO DETERMINE ANGULAR ORIENTATION OF SECOND MICROPHONE ARRAY WITH RESPECT TO IMAGE CAPTURE DEVICE 752

↓

PLURALITY OF LIGHT SOURCES ARE ARRANGED IN PATTERN AND ILLUMINATED IN SPATIALLY-RECOGNIZABLE MANNER 756

↓

DETERMINE THAT AT LEAST ONE OF FIRST MICROPHONE ARRAY AND SECOND MICROPHONE ARRAY HAS MOVED 760

ANALYZE SIGNAL FROM ONE OR MORE OF ACCELEROMETER IN FIRST MICROPHONE ARRAY, MAGNETOMETER IN FIRST MICROPHONE ARRAY, ACCELEROMETER IN SECOND MICROPHONE ARRAY, AND MAGNETOMETER IN SECOND MICROPHONE ARRAY 764

↓

RECOMPUTE ONE OR MORE OF THE LOCATION AND ANGULAR ORIENTATION OF SECOND MICROPHONE ARRAY 768

↓

RECEIVE SIGNAL FROM MAGNETOMETER IN SECOND MICROPHONE ARRAY 772

↓

USING MAGNETOMETER SIGNAL, DETERMINE ANGULAR ORIENTATION OF SECOND MICROPHONE ARRAY 776

↓

DETERMINE THAT IMAGE DATA DOES NOT COMPRISE IMAGE DATA OF PLURALITY OF LIGHT SOURCES OF THE SECOND MICROPHONE ARRAY 780

↓

OUTPUT NOTIFICATION INDICATING THAT SECOND MICROPHONE ARRAY IS OCCLUDED FROM VIEW OF THE IMAGE CAPTURE DEVICE 784

↓

END

ACTIVE SPEAKER LOCATION DETECTION

CROSS REFERENCE TO RELATED APPLICATIONS

This application is a continuation of U.S. patent application Ser. No. 14/991,847, filed on Jan. 8, 2016, and titled "ACTIVE SPEAKER LOCATION DETECTION", the entire disclosure of which is hereby incorporated herein by reference.

BACKGROUND

Video conferencing systems utilize audio and video telecommunications to allow participants in one location to interact with participants in another location. Some video conferencing systems may capture and transmit a view of multiple participants for display at another system. To help viewers at one location track a conversation at another location, a video conferencing system may attempt to determine the person speaking at the other location. However, challenges exist to accurately identifying an active speaker. The technological solutions described herein offer the promise of addressing such challenges.

SUMMARY

Various examples are disclosed herein that relate to determining a location of an active participant. In one example, a method for determining a location of an active participant may comprise receiving from an image capture device image data of a room in which the active participant and at least one inactive participant are located. First audio data from the room may be received from a first microphone array at the image capture device. Second audio data from the room may be received from a second microphone array that is spaced from the image capture device.

Using a three dimensional model, a location of the second microphone array with respect to the image capture device may be determined. Using at least the first audio data, the second audio data, the location of the second microphone array, and an angular orientation of the second microphone array, an estimated location in the three dimensional model of the active participant may be determined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A and 7B are a flow chart of a method for determining a location of an active speaker according to an example of the present disclosure.

DETAILED DESCRIPTION

Figure 1:
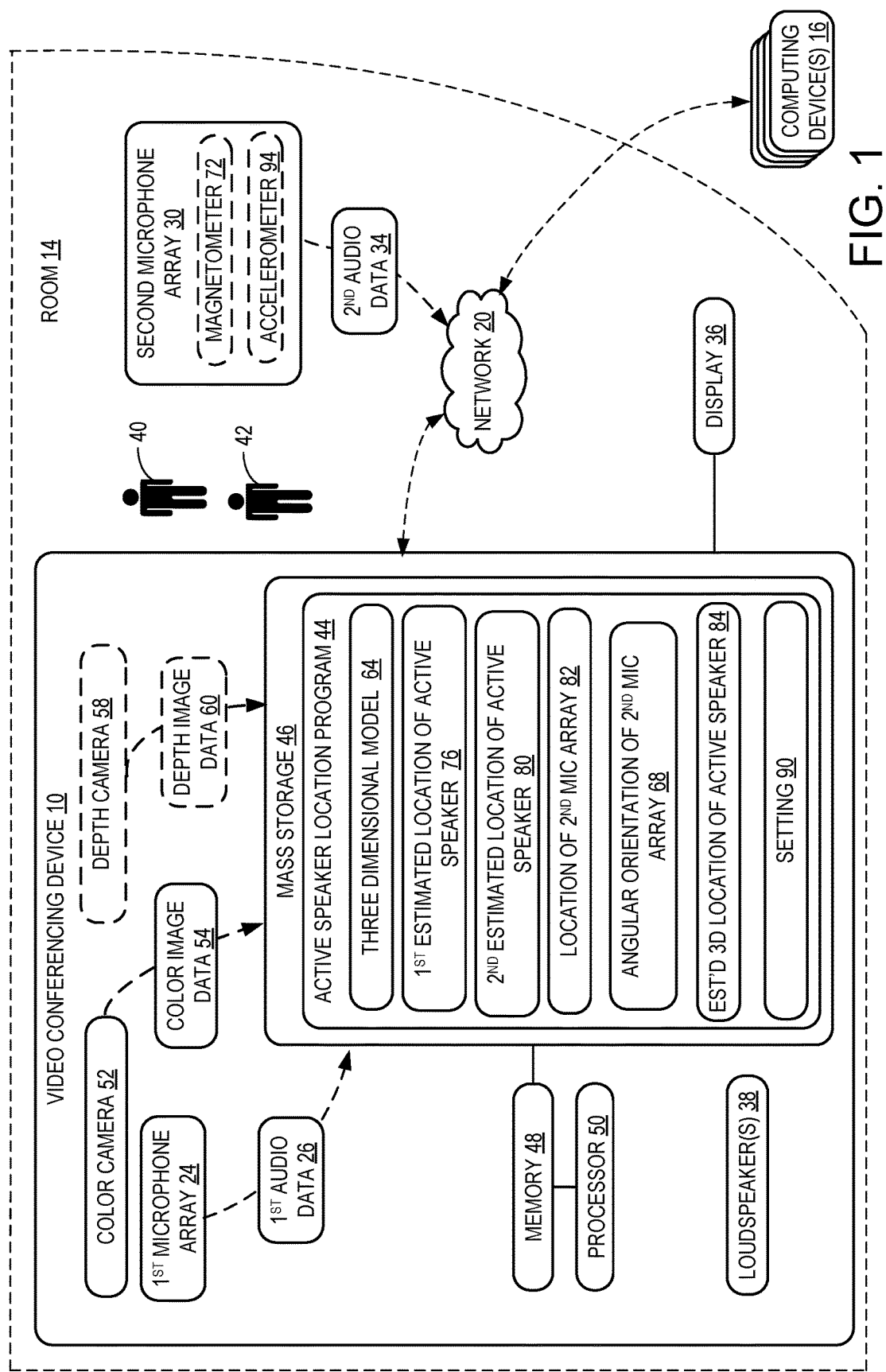
FIG. 1 is a schematic diagram showing a video conferencing device and second microphone array for determining a location of an active speaker according to an example of the present disclosure.

FIG. 1 shows a schematic view of one example of a video conferencing device 10 for determining a location of an active speaker in a room 14. The video conferencing device 10 includes video conferencing components to communicatively couple the device with one or more other computing devices 16 at different locations. For example, the video conferencing device 10 may be communicatively coupled with other computing device(s) 16 via a network 20. In some examples, the network 20 may take the form of a local area network (LAN), wide area network (WAN), wired network, wireless network, personal area network, or a combination thereof, and may include the Internet.

As described in more detail below, the video conferencing device 10 may include a first microphone array 24 that receives first audio data 26 from the room 14. A second microphone array 30 may be located in the room 14 and may receive second audio data 34 from the room 14. The second microphone array 30 may provide the second audio data 34 to the video conferencing device 10. As shown in FIG. 1, in some examples the second microphone array 30 may be wirelessly coupled to the video conferencing device 10, such as via network 20. In some examples, the second microphone array 30 may be wirelessly coupled to the video conferencing device 10 utilizing a wireless communication protocol, such as Bluetooth or other suitable protocol.

The video conferencing device 10 may be communicatively coupled to a display 36, such as a monitor or other display device, that may display video received from computing device(s) 16. The video conferencing device 10 may include one or more electroacoustic transducers, or loudspeakers 38, to broadcast audio received from computing device(s) 16 during a teleconferencing session. In this manner, one or more participants 40, 42 in the room 14 may conduct a video conference with one or more remote participants located at computing device(s) 16.

As described in more detail below, the video conferencing device 10 includes an active speaker location program 44 that may be stored in mass storage 46 of the video conferencing device 10. The active speaker location program 44 may be loaded into memory 48 and executed by a processor 50 of the video conferencing device 10 to perform one or more of the methods and processes described in more detail below.

The video conferencing device 10 also may include one or more image capture devices. In the example of FIG. 1, video conferencing device 10 includes a color camera 52, such as an RGB camera, that captures color image data 54 from the room 14. In some examples, the video conferencing device also may include a depth camera 58 that may capture depth image data 60 from the room 14. In one example the depth camera 58 may comprise an infrared time-of-flight depth camera and an associated infrared illuminator. In another example, the depth camera may comprise an infrared structured light depth camera and associated infrared illuminator.

As described in more detail below, image data from the image capture device(s) may be used by the active speaker location program 44 to generate a three dimensional model 64 of at least a portion of the room 14. Such image data also may be used to construct still images and/or video images of the surrounding environment from the perspective of the video conferencing device 10. The image data also may be used to measure physical parameters and to identify surfaces of a physical space, such as the room 14, in any suitable manner. In some examples, surfaces of the room 14 may be identified based on depth maps derived from color image data 54 provided by the color camera. In other examples, surfaces of the room 14 may be identified based on depth maps derived from depth image data 60 provide by the depth camera 58.

In some examples, the video conferencing device 10 may comprise a standalone computing system. In some examples, the video conferencing device 10 may comprise a component of another computing device, such as a set-top box, gaming system, interactive television, interactive whiteboard, or other like device. In some examples, the video conferencing device 10 may be integrated into an enclosure comprising a display. Additional details regarding the components and computing aspects of the video conferencing device 10 are described in more detail below with reference to FIG. 8.

Figure 2:
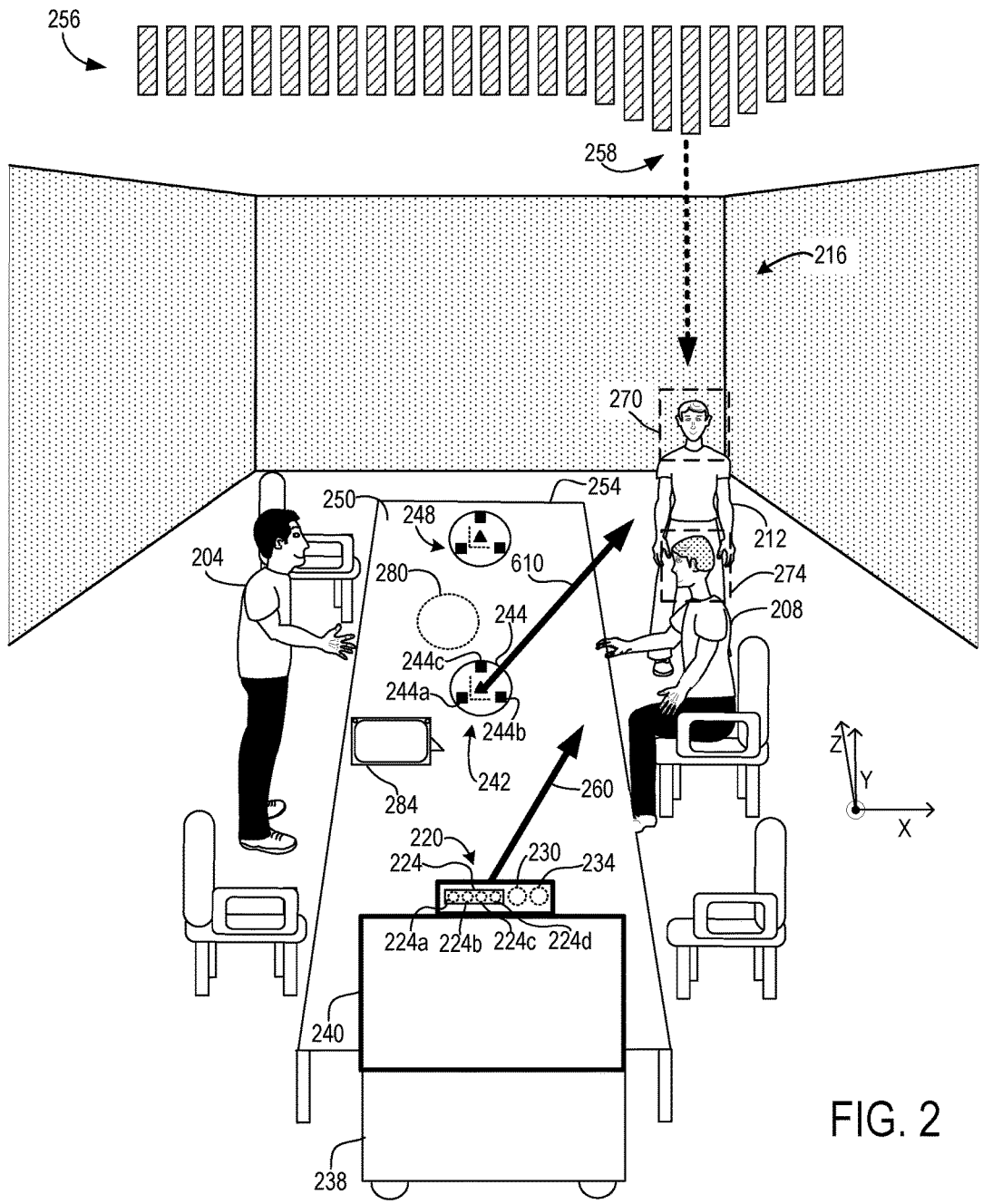
FIG. 2 shows a schematic perspective view of a room including several people and a video conferencing device and second microphone array for determining a location of an active speaker according to an example of the present disclosure.

With reference now to FIG. 2, example use cases of a video conferencing device according to the present disclosure will be described. In the example of FIG. 2, a first participant 204, second participant 208 and third participant 212 in room 216 may utilize video conferencing device 220 to conduct a video conference with one or more remote participants at a different location.

The video conferencing device 220 may take the form of video conferencing device 10 shown in FIG. 1 or other suitable configuration. In this example, video conferencing device 220 includes a first microphone array 224 that utilizes four unidirectional microphones 224a, 224b, 224c, and 224d, such as cardioid microphones, that are arranged in a linear array facing outward in the z-axis direction across table 254. In other examples, the first microphone array may utilize any other suitable number, type and configuration of microphones. In the example of FIG. 1, the video conferencing device 220 includes an RGB camera 230 and a depth camera 234 facing outward in the z-axis direction across table 254. As noted above, in other examples a video conferencing device of the present disclosure may utilize a color camera without a depth camera.

In this example the video conferencing device 220 is a self-contained unit that is removably positioned on a top surface of a video monitor 240. The video conferencing device 220 is communicatively coupled to video monitor 240 to provide a video feed from the remote participant(s) who are utilizing one or more computing systems that include video conferencing capabilities.

Figure 4:
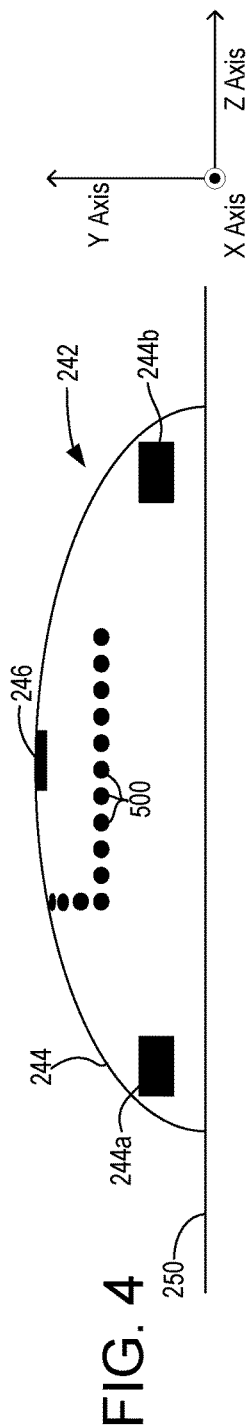
FIG. 4 shows a schematic side view of the second microphone array of FIG. 2 according to an example of the present disclosure.
Figure 5:
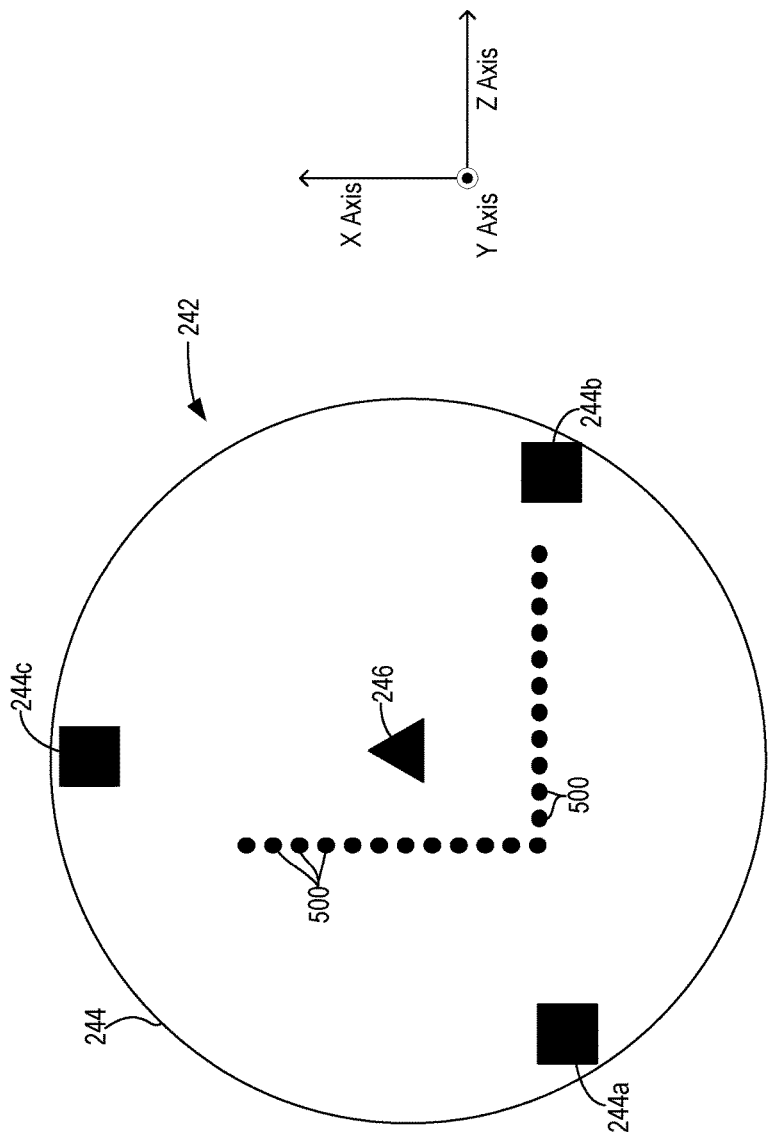
FIG. 5 shows a schematic top view of the second microphone array of FIG. 2 according to an example of the present disclosure.

With reference also to FIGS. 4 and 5, in one example a second microphone array 242 comprises a circular array of three unidirectional cardioid microphones 244a, 244b and 244c arranged around the periphery of a hemispherical base 244, and a fourth microphone 246 located at an elevated top center of the hemispherical base 244. In other examples, the second microphone array 242 may utilize any other suitable number, type and configuration of microphones. In some examples, the second microphone array 242 may comprise a generally planar array of microphones that does not include an elevated microphone. In some examples, the second microphone array 242 may comprise a memory that stores parametric information that defines operational characteristics and configurations of the microphone array.

Figure 3:
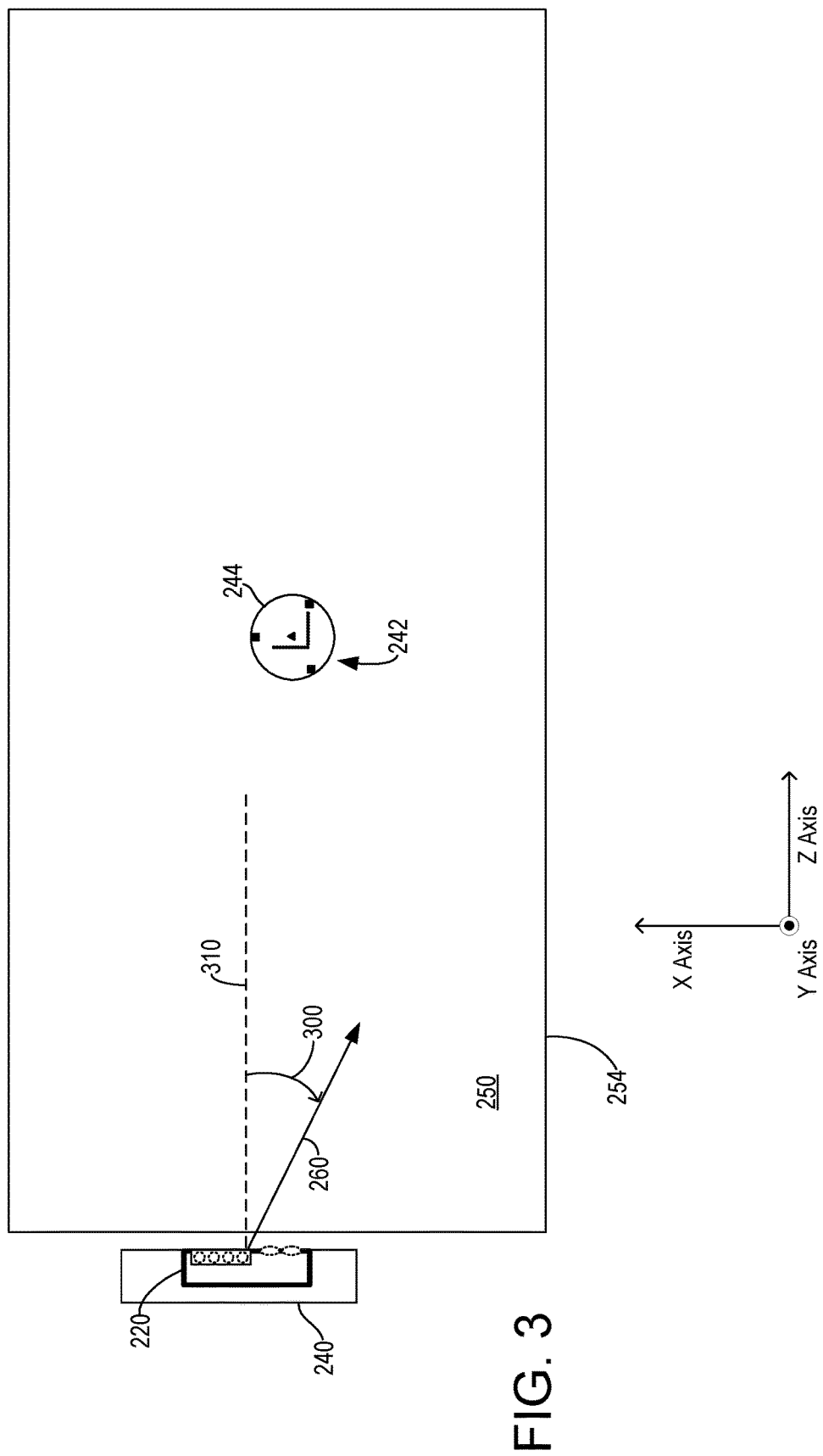
FIG. 3 shows a simplified schematic top view of the video conferencing device and second microphone array in the room of FIG. 2.

In the example of FIG. 2 and with reference also to FIGS. 3-5, the second microphone array 242 is laterally spaced from the video conferencing device 220 and positioned on the flat surface 250 of the table 254 in room 216. In other examples, a second microphone array may be positioned at different locations on the table 254, or in different locations within the room 216, such as mounted on the ceiling or a wall of the room. In some examples, one or more additional microphones and/or microphone arrays may be utilized.

In the example of FIG. 2, the video conferencing device 220 and the second microphone array 242 may be moved relative to one another in one or more of the x-axis, y-axis, and z-axis directions. In other words and for example, the three dimensional location of the RGB camera 230 and depth camera 234 relative to the second microphone array 242 may change from one meeting to the next, and in some cases may change during a meeting.

For example, the vertical y-direction offset between the video conferencing device 220 and the second microphone array 242 may be different between one meeting and another meeting. In the example of FIG. 2, the video conferencing device 220 is located on monitor 240 at one end of the table 254. In this example the vertical y-axis direction offset between the video conferencing device 220 and the second microphone array 242 may be, for example, 1 meter.

For another meeting in a different room, the video conferencing device 220 may be used with a different display device having, for example, a different height as compared to monitor 240. The second microphone array 242 may be placed on a table in the different room that also has a different height as compared to the table 254. Accordingly, the vertical y-axis offset between the video conferencing device 220 and the second microphone array 242 in room 216 of FIG. 2 will be different from the vertical y-direction offset between the video conferencing device 220 and the second microphone array 242 in the different room. As explained in more detail below, despite different vertical y-direction offsets in different rooms or other configurations, the video conferencing device of the present disclosure may accurately determine the location of an active speaker in such rooms or other configurations.

With continued reference to the example shown in FIGS. 2 and 3, the video conferencing device 220 may capture image data of the room 216 using one or both of the RGB camera 230 and the depth camera 234. Using this image data, the active speaker location program 44 of video conferencing device 220 may generate a three dimensional model 64 of at least a portion of the room 216. For example, the three dimensional model may comprise the surfaces and objects in front of the video conferencing device 220 in the positive z-axis direction, including at least portions of the first participant 204, second participant 208 and third participant 212. In some examples, the three dimensional model may be determined using a three dimensional coordinate system having an origin at the video conferencing device 220.

The video conferencing device 220 may identify the second microphone array 242 and may communicatively couple to the second microphone array. In some examples, the video conferencing device may wirelessly discover and pair with the second microphone array via a wireless protocol, such as the Bluetooth wireless protocol. In other examples, the video conferencing device 220 may be coupled to the second microphone array 242 via a wired connection. In some examples, the image data may be used to identify the second microphone array 242.

Using the image data and the three dimensional model, the active speaker location program 44 may locate the second microphone array 242 on the table 254 in three dimensions relative to the image capture device(s) of the video conferencing device 220, such as the RGB camera 230 and/or the depth camera 234. In this manner, the active speaker location program 44 may use the three dimensional model 64 to determine a three dimensional location of the second microphone array 242 with respect to the video conferencing device 220 and/or an image capture device(s) of the video conferencing device. In some examples, the location of the second microphone array 242 with respect to the image capture device may be determined with an accuracy of at least +/−10 mm. in the x-axis, y-axis, and z-axis directions.

An angular orientation 68 of the second microphone array 242 with respect to the video conferencing device 220 and/or its image capture device(s) also may be determined. In some examples, the active speaker location program 44 may determine the angular orientation 68 of the second microphone array 242 using light emitted from a plurality of light sources of the second microphone array. For example, image data captured by the RGB camera 230 may comprise signals corresponding to light emitted from a plurality of light sources of the second microphone array 242. As described in more detail below, the active speaker location program 44 may utilize such signals to determine the angular orientation 68 of the second microphone array 242 with respect to the RGB camera 230 and video conferencing device 220.

In one example, the plurality of light sources may comprise a plurality of LED lights that are arranged in a pattern on the hemispherical base 244 of the second microphone array 242. In some examples, the lights may operate within the infrared spectrum, such as with a wavelength of approximately 700 nm. In these examples the lights may not be visible to the human eye, but may be detectable by the RGB camera 230.

With reference to the example shown in FIGS. 2, 4 and 5, a plurality of LED lights 500 may be arranged in an "L" shape on the hemispherical base 244. In one example, all of the LED lights 500 may be illuminated simultaneously, and the image data may be analyzed to determine the angular orientation 68 of the second microphone array 242 with respect to video conferencing device 220 and corresponding image capture device(s). In this manner and in combination with the image data, the particular location of each of the microphones 244a, 244b, 244c and 246 with respect to video conferencing device 220 and corresponding image capture device(s) may be determined.

In other examples, the LED lights 500 may be illuminated in a spatially-recognizable manner that may be identified and used to determine the angular orientation 68 of the second microphone array 242 with respect to video conferencing device 220 and corresponding image capture device(s). For example, each of the LED lights 500 may be illuminated individually and in a particular sequence until all lights have been illuminated, with such illumination cycle repeated. In one example and with reference to FIG. 5, the LED lights 500 may be individually illuminated in order beginning with the LED nearest microphone 244c and ending with the LED nearest the microphone 244b. Any other suitable sequences of illumination also may be utilized.

In other examples, the plurality of LED lights 500 may be arranged in other spatially-recognizable patterns, such as a "+" shape, that may be utilized in combination with particular illumination sequences to determine the angular orientation 68 of the second microphone array 242.

In some examples and as schematically illustrated in FIG. 1, the second microphone array 242 may comprise a magnetometer 72, such as a three-axis magnetometer. Using a measurement of the earth's magnetic field, the magnetometer 72 may generate a corresponding signal that is output and received by the video conferencing device 220. Using this signal and in combination with the color image data 54 and/or depth image data 60, the active speaker location program 44 may determine the angular orientation 68 of the second microphone array 242.

With reference again to FIGS. 1 and 2, examples of determining an estimated three dimensional location of an active speaker in room 216 will now be described. In one example, the second participant 208 may be speaking while the first participant 204 and third participant 212 are inactive speakers who are not speaking. First audio data 26 received from the first microphone array 224 may be analyzed by the active speaker location program 44 to determine a first estimated location 76 of the active speaker. In some examples, the first audio data 26 may be used to generate a one-dimensional sound source localization (SSL) distribution corresponding to a first estimated location 76 of the active speaker with respect to the video conferencing device 220.

In some examples, techniques based on time delay estimates (TDEs) may be utilized to generate an SSL distribution. TDEs utilize the principle that sound reaches the differently located microphones at slightly different times. The delays may be computed using, for example, cross-correlation functions between the signals from different microphones. In some examples, different weightings (such as maximum likelihood, PHAT, etc.) may be used to address reliability and stability of the results under noise and/or reverberation conditions.

FIG. 2 schematically illustrates an example SSL distribution 256 in an x-axis direction across the room 216 that may be generated using first audio data 26 from the first microphone array 224. In this example, the SSL distribution 256 comprises a probability distribution function (PDF) indicating a probability of an active speaker located along the PDF. In this example, a peak 258 in the SSL distribution 256 indicates a likely location of an active speaker along the x-axis.

With reference also to FIG. 3, a first estimated location 76 of the active speaker along an azimuth 300 that corresponds to the peak 258 may be determined. In some examples and with reference to FIGS. 2 and 3, the azimuth 300 may be defined by a vector 260 extending from the video conferencing device 220 toward the peak 258 of the SSL distribution 256, with the vector projected onto a reference plane parallel to the surface 250 of table 254. In this example and as shown in FIG. 3, the azimuth 300 is the angle between the projected vector 260 and a reference vector 310 extending in the z-axis direction in the reference plane perpendicular from the video conferencing device 200.

In some examples, such an estimated location may be used in an active speaker detection (ASD) program along with image data to estimate a location of the active speaker. An ASD program may utilize this data in a machine learning infrastructure to estimate the location of the active speaker. For example, an ASD program may utilize a boosted classifier with spatiotemporal Haar wavelets in color and depth to estimate an active speaker location. The active speaker location program 44 may comprise an ASD program.

In some examples, determining such an estimated location of an active speaker using a single SSL distribution may be insufficient to distinguish between two or more potential active speakers. For example, when two or more potential active speakers are located along the vector that is defined by the peak of the single SSL distribution, image data may not be sufficient to distinguish between the potential active speakers. For example and with reference to FIG. 2, the peak 258 of SSL distribution 256 and corresponding vector 260 indicate that either the second participant 208 or the third participant 212 might be the active speaker in room 216.

Figure 6:
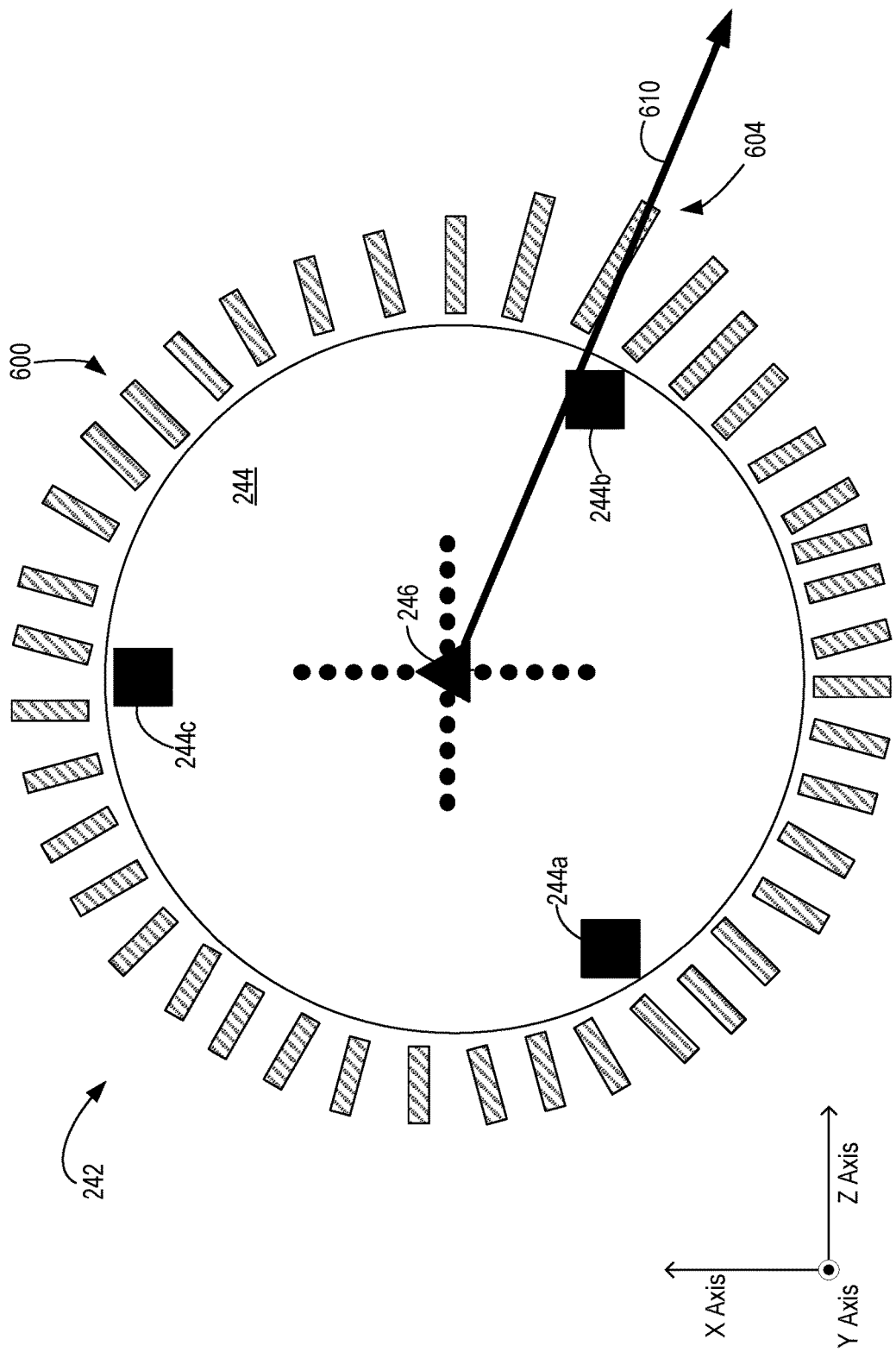
FIG. 6 shows the second microphone array of FIG. 2 with a sound source localization distribution according to an example of the present disclosure.

With reference now to FIGS. 2 and 6 and in some examples, a second SSL distribution may be determined from the second microphone array 242. In this example, the second SSL distribution may comprise a circular two-dimensional SSL distribution 600 that corresponds to a PDF of the active speaker with respect to the second microphone array 242. In other examples, other configurations of a second microphone array may be utilized to generate a second SSL distribution. For example, one or more linear arrays of microphones may be laterally spaced from the video conferencing device, and may be used to generate a second SSL distribution.

With reference to FIG. 2, in one example the third participant 212 may be actively speaking while the second participant 208 and first participant 204 are not speaking. In this example and with reference now to FIGS. 1 and 6, second audio data 34 from the second microphone array 242 may be used to generate a circular SSL distribution 600 in an x-axis/z-axis plane that includes a peak 604 corresponding to a second estimated location 80 of an active speaker. Using this second SSL distribution 600, a second vector 610 may be computed that extends from a center of the hemispherical base 244 of the second microphone array 242 through the peak 604 of the SSL distribution 600.

As noted above, in some examples the relative position and location of the video conferencing device 220 with respect to the second microphone array 242 may change between different meetings, different room set ups, different positionings of the video conferencing device and/or second microphone array, etc. Accordingly, and to locate the second SSL distribution 600 and second vector 610 relative to the video conferencing device 220, a location 82 of the second microphone array with respect to the image capture device of the video conferencing device may be determined.

In some examples, color image data 54 comprising the second microphone array 242 may be used to identify the second microphone array and to estimate its location within the three dimensional model 64 of the room 216. For example, range or depth information corresponding to the second microphone array 242 may be estimated using, for example, stereo reconstructions techniques and triangulation or epipolar geometry, shape-from-shading techniques, shape-from-texture techniques, etc. In this manner, a location 82 of the second microphone array 242 with respect to the image capture device of the video conferencing device 220 may be determined. In other words, the locations of the second microphone array 242 and the video conferencing device 220 may be determined within a common three-dimensional model 64 of the room 216.

In some examples, depth image data 60 from one or more depth cameras 58 of the video conferencing device may be utilized to determine a three-dimensional location 82 of the second microphone array 242 with respect to depth camera(s) and video conferencing device. In this manner and as noted above, the locations of the second microphone array 242 and the video conferencing device 220 may be determined within the three-dimensional model 64 of the room 216.

As described in more detail below, using the location 82 of the second microphone array 242 with respect to the video conferencing device 220 and its image capture device(s), along with the angular orientation of the second microphone array with respect to the video conferencing device, an estimated location 84 of the active speaker within the three dimensional model 64 of room 216 may be determined. In some examples, an estimated location 84 of the active speaker may be determined by calculating the intersection point of vector 260 from the video conferencing device 220 and vector 610 from the second microphone array 242. In the example of FIG. 2, vector 260 and vector 610 will intersect at or near the third participant 212. The location of the third participant 212 within the three dimensional model 64 of the room 216 also may be determined from the image data. Using the foregoing information, along with the angular location of the second microphone array 242, an estimated three dimensional location 84 of the active speaker in room 216, corresponding to the third participant 212, may be determined.

As noted above and in some examples, an ASD program of the active speaker location program 44 may utilize this data to estimate the location of the active speaker. In some examples and with reference to FIG. 2, an ASD program may initially select multiple potential active speakers, such as the second participant 208 and third participant 212, based on the SSL distribution 256 corresponding to the first audio data 26 from the first microphone array 224. Using color image data 54 from the RGB camera 230, for each potential active speaker the ASD program may determine the location of the person's head, as indicated by the bounding boxes 270 and 274.

The active speaker location program 44 may utilize the SSL distribution 600 from the second microphone array 242 to determine which of the two potential active speakers is more likely to correspond to the actual active speaker. For example, the bounding boxes 270 and 274 may be projected onto an x-axis/z-axis plane of the second vector 610 of the SSL distribution 600 from the second microphone array 242. In this manner, it may be determined that the second vector 610 intersects the projected bounding box 270 corresponding to the third participant 212. Accordingly, the third participant may be selected as the active speaker.

In some examples to determine a location of a potential active speaker, an ASD program may apply a classifier to one or more sub-regions of the room 216 in one or more image(s) captured by the RGB camera 230. In some examples, the classifier may be selectively applied to those sub-regions that are close to the peak 258 of the SSL distribution 256 from the first microphone array 224.

The results generated by the classifier for a sub-region may be compared to a predetermined threshold to determine whether an active speaker is located within the image or sub-region. If the results for a sub-region exceed the threshold, then an active speaker may be indicated for that sub-region. In some examples and prior to applying the threshold, the results of the classifier may be adjusted based on second SSL distribution 600 of the second microphone array 242. For example, if a particular sub-region is located at or near the peak 604 of the second SSL distribution 600, the classifier results for that sub-region may be boosted accordingly, thereby increasing the likelihood of exceeding the threshold and indicating that an active speaker is located in such sub-region. Likewise, if a particular sub-region is not located at or near a peak of the second SSL distribution 600, then the classifier results for that sub-region may be reduced accordingly.

In some examples, both SSL distribution 256 from the first microphone array 224 and SSL distribution 600 from the second microphone array 242 may be analyzed to select one or more particular sub-regions within room 216 to scan for potential active speakers. In these examples, sub-regions of a room image that correspond to the peak 258 of SSL distribution 256 and/or peak 604 of SSL distribution 600 may be selectively scanned by an ASD program to identify potential active speakers in the room.

In some examples, SSL distribution 256 from the first microphone array 224 and SSL distribution 600 from the second microphone array 242 may be normalized and combined into a combination SSL distribution. Such combination SSL distribution may be provided to an ASD program of the active speaker location program 44 to detect one or more potential active speakers.

In some examples, SSL distribution 256 and SSL distribution 600 may be normalized to a common coordinate system and added to a discrete three dimensional PDF representing the room 216. As noted above, determining the three dimensional location of the second microphone array 242 with respect to the video conferencing device 220 allows both SSL distribution 256 and SSL distribution 600 to be located in a common three dimensional model and coordinate system. In this manner, the two SSL distributions may be combined and utilized to determine an estimated three dimensional location of an active speaker.

The estimated three dimensional location of an active speaker may be utilized by the active speaker location program 44 to compute a setting 90 for the color camera 52 of the video conferencing device. In some examples, the setting 90 may comprise one or more of an azimuth of the active speaker with respect to the color camera 52, an elevation of the active speaker with respect to the camera, and a zoom parameter of the camera. In some examples, a video capture program may use the setting 90 to highlight the active speaker. In one example and with reference to FIG. 2, a setting 90 for the RGB camera 230 may comprise an azimuth of the active speaker with respect to the camera (in the X-Z plane), an elevation of the active speaker with respect to the camera (in the Y direction), and a zoom parameter for the camera. Using this setting, the video capture program may cause the color camera 52 to optically or programmatically zoom into the face of the active speaker. In some examples, an ASD program of the active speaker location program 44 may use color image data 54 to identify a head and/or face of an active speaker. The video conferencing device 220 may then highlight the active speaker by providing the zoomed-in video feed to the one or more other computing devices 16 participating in the video conference, such as in an inset video window within a larger video window showing the room 216.

In some examples of using the setting 90, the active speaker may be highlighted in the video feed to the other computing device(s) 16 by visually emphasizing the active speaker via, for example, an animated box or circle around the head of the active speaker, an arrow pointing to the active speaker, on-screen text adjacent to the active speaker (such as, "John in speaking"), and the like.

As noted above, in some examples one or more additional microphones and/or microphone arrays may be utilized in practicing the principles of the present disclosure. For example, audio data from a third microphone array 248 in addition to the second microphone array 242 and first microphone array 224 may be utilized to determine an estimated location in the three dimensional model of the active speaker. In some examples, the third microphone array 248 may have the same or similar configuration as the second microphone array 242. The third microphone array 248 may be located on the surface 250 of the table 254 at a location different from the second microphone array 242. In these examples, audio data from the third microphone array 248 may be used in one or more manners similar to the audio data from the second microphone array 242 to determine an estimated location in the three dimensional model of the active speaker as described herein.

As noted above and with reference again to FIG. 2, determining the location of an active speaker may include determining a location of the second microphone array 242 relative to the location of the video conferencing device 220. In some examples, after such locations have been determined and a video conference has begun, the location of the second microphone array 242 relative to the location of the video conferencing device 220 may change. For example, a participant may move the second microphone array 242 to another location on the table, such as the new location 280 indicated in FIG. 2.

In these situations, the active speaker location program 44 may determine that the first microphone array and/or the second microphone array has moved from a first location to a second, different location. Accordingly, and based on determining that at least one of the first microphone array 224 and the second microphone array 242 has moved, the active speaker location program 44 may recompute one or more of the location and the angular orientation of the second microphone array. In this manner, the active speaker location program 44 may update the relative positions of the second microphone array 242 and the video conferencing device 220 to ensure continued accuracy of the estimated location of the active speaker. In some examples, the relative positions of the second microphone array 242 and the video conferencing device 220 may change based on the video conferencing device 220 being moved (instead of or in addition to the second microphone array being moved). For example and as shown in FIG. 2, the video conferencing device 220 and monitor 240 may be removably mounted on a moveable cart 238. After a video conference has begun, a participant could bump the cart 238 and thereby change the position of the video conferencing device 220 with respect to the second microphone array 242. In these examples and based on determining that the video conferencing device 220 has moved, the active speaker location program 44 may recompute one or more of the location and the angular orientation of the second microphone array 242.

In some examples the active speaker location program 44 may determine that the second microphone array 242 has moved to a different location by analyzing image data and detecting a change in location of the second microphone array. In some examples, the second microphone array 242 may comprise an accelerometer 94 that may detect an acceleration of the second microphone array. In these examples, the active speaker location program 44 may determine that the second microphone array 242 has moved by receiving a signal from the accelerometer 94 indicating movement of the second microphone array. In some examples, the second microphone array 242 may comprise a magnetometer 72. In these examples, the active speaker location program 44 may determine that the second microphone array 242 has moved by receiving a signal from the magnetometer 72 indicating a change in orientation of the second microphone array.

In a similar manner and in some examples, the video conferencing device 220 may comprise an accelerometer, which in some examples may be located in the first microphone array 224. In these examples, the active speaker location program 44 may determine that the video conferencing device 220 and first microphone array 224 have moved by receiving a signal from the accelerometer indicating movement of the video conferencing device. In some examples, the video conferencing device 220 may comprise a magnetometer, which in some examples may be located in the first microphone array 224. In these examples, the active speaker location program 44 may determine that the video conferencing device 220 and first microphone array 224 have moved by receiving a signal from the magnetometer indicating a change in orientation of the video conferencing device 220.

In some examples, a view of the second microphone array 242 from the RGB camera 230 and/or the depth camera 234 may be blocked or occluded. For example, an object on the table 254, such as the tablet computer 284, may be moved between the cameras of the video conferencing device 220 and the second microphone array 242. In these examples, the active speaker location program 44 may determine that the image data does not comprise image data of the plurality of light sources 500 of the second microphone array 242.

Lacking image data of the light sources 500, the active speaker location program 44 may be incapable of accurately determining an angular orientation 68 of the second microphone array 242. In response and to alert the participants of this situation, the active speaker location program 44 may output a notification indicating that the second microphone array is occluded from view of the image capture device(s) of the video conferencing device 220. With such notification, the participants may then remove any obstructions or reposition the second microphone array 242 as needed. The notification may take the form of an audible alert broadcast by the video conferencing device 220, a visual notification displayed on monitor 240, or other suitable notification.

Figure 7A:
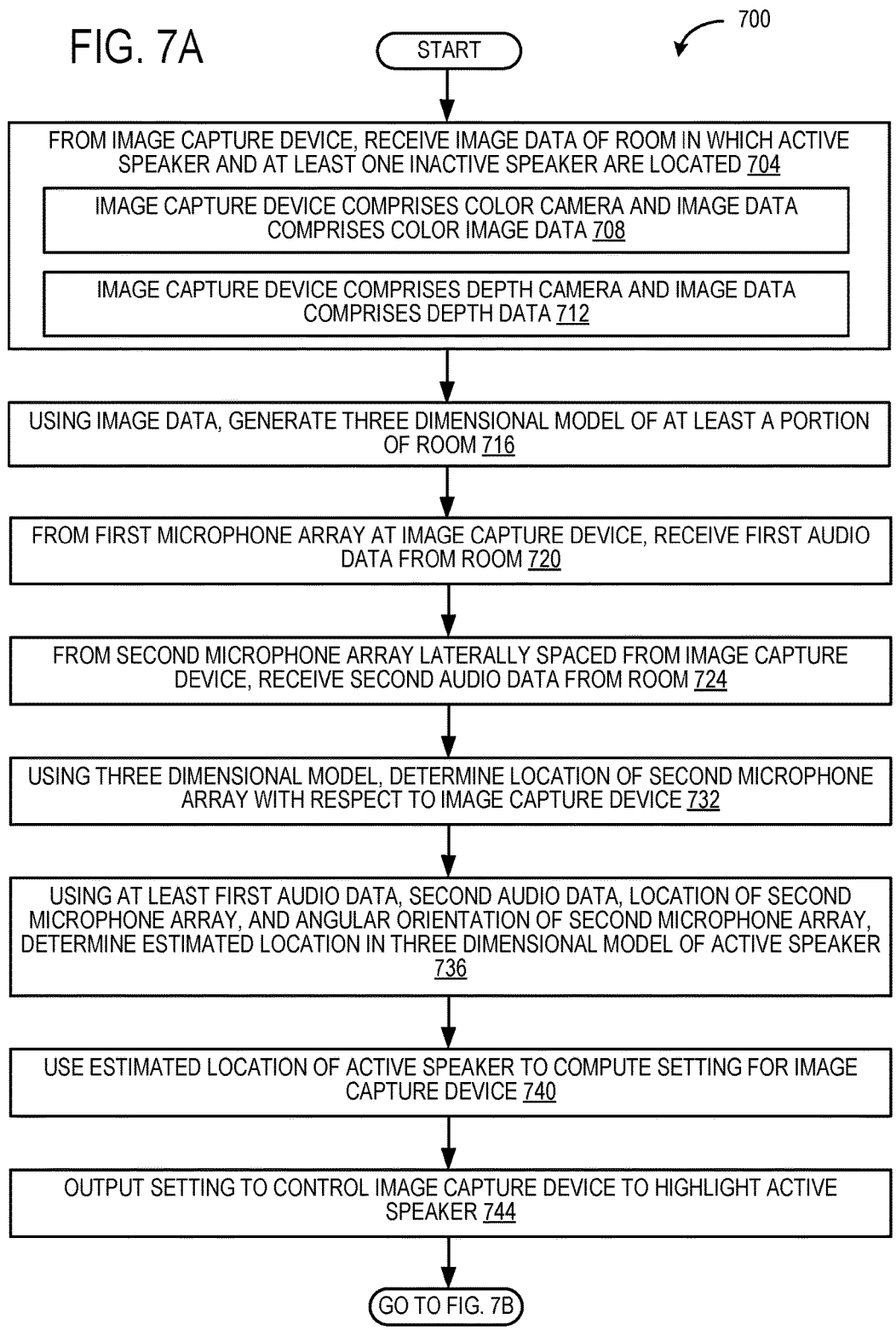

FIGS. 7A and 7B show a method 700 for determining a location of an active speaker according to an example of the present disclosure. The following description of method 700 is provided with reference to the software and hardware components of the video conferencing devices 10 and 220 and second microphone arrays 30 and 242 described above and shown in FIGS. 1-6. It will be appreciated that method 700 may also be performed in a variety of other contexts and using other suitable hardware and software components.

At 704 the method 700 may include, from an image capture device, receiving image data of a room in which the active speaker and at least one inactive speaker are located. At 708 the image capture device may comprise a color camera and the image data may comprise color image data. At 712 the image capture device may comprise a depth camera and the image data may comprise depth data. At 716 the method 700 may include, using the image data, generating a three dimensional model of at least a portion of the room. At 720 the method 700 may include, from a first microphone array at the image capture device, receiving first audio data from the room.

At 724 the method 700 may include, from a second microphone array that is laterally spaced from the image capture device, receiving second audio data from the room. At 732 the method 700 may include, using the three dimensional model, determining a location of the second microphone array with respect to the image capture device. At 736 the method 700 may include, using at least the first audio data, the second audio data, the location of the second microphone array, and an angular orientation of the second microphone array, determining an estimated location in the three dimensional model of the active speaker.

At 740 the method 700 may include using the estimated location of the active speaker to compute a setting for the image capture device. At 744 the method 700 may include outputting the setting to control the image capture device to highlight the active speaker. With reference now to FIG. 7B, at 752 the method 700 may include, where the image data comprises signals corresponding to light emitted from a plurality of light sources of the second microphone array, using the signals to determine the angular orientation of the second microphone array with respect to the image capture device. At 756 the plurality of light sources may be arranged in a pattern and illuminated in a spatially-recognizable manner.

At 760 the method 700 may include determining that at least one of the first microphone array and the second microphone array has moved. At 764 determining that at least one of the first microphone array and the second microphone array has moved may comprise analyzing a signal received from one or more of an accelerometer in the first microphone array, a magnetometer in the first microphone array, an accelerometer in the second microphone array, and a magnetometer in the second microphone array. At 768 the method 700 may include, based on determining that at least one of the first microphone array and the second microphone array has moved, recomputing one or more of the location and the angular orientation of the second microphone array.

At 772 the method 700 may include receiving a signal from a magnetometer in the second microphone array. At 776 the method 700 may include, using the magnetometer signal, determining the angular orientation of the second microphone array. At 780 the method 700 may include determining that the image data does not comprise image data of a plurality of light sources of the second microphone array. At 784 the method 700 may include outputting a notification indicating that the second microphone array is occluded from view of the image capture device.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Figure 8:
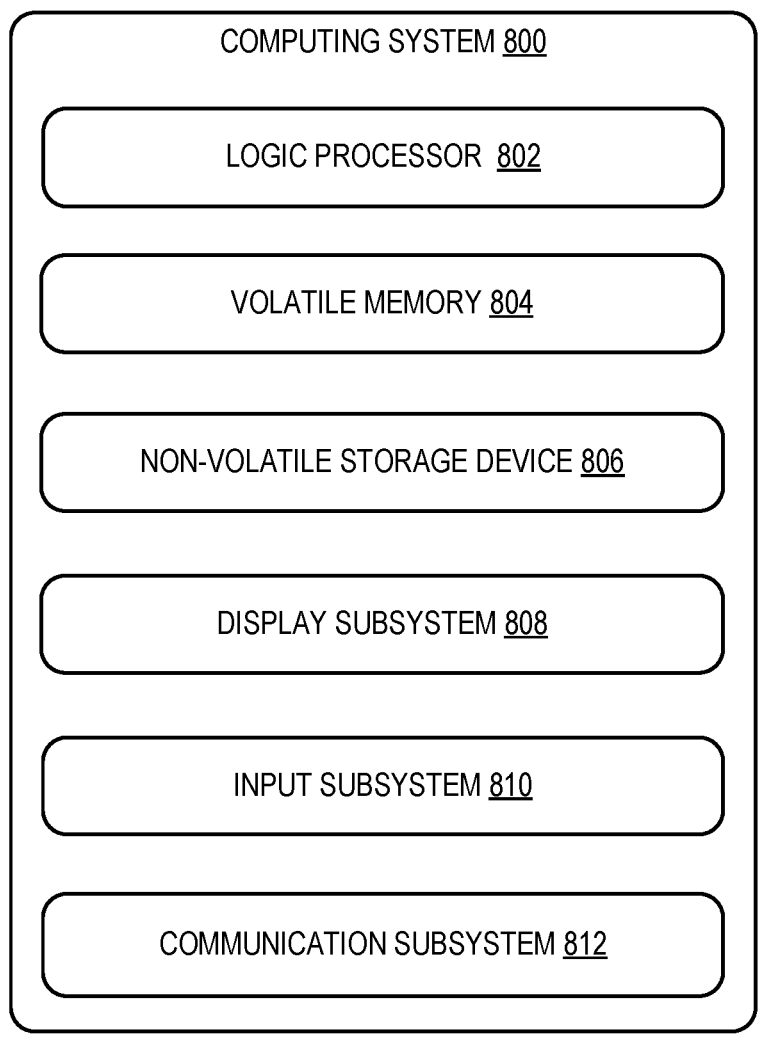
FIG. 8 shows a simplified schematic illustration of an example of a computing system.

FIG. 8 schematically shows a non-limiting embodiment of a computing system 800 that can enact one or more of the methods and processes described above. Computing system 800 is shown in simplified form. Computing system 800 may embody one or more of the video conferencing devices 10 and 220, second microphone arrays 30 and 242, and other computing devices 16 described above. Computing system 800 may take the form of one or more personal computers, server computers, tablet computers, home-entertainment computers, network computing devices, gaming devices, mobile computing devices, mobile communication devices (e.g., smart phone), wearable computing devices such as head mounted display devices, and/or other computing devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 804 may include physical devices that include random access memory. Volatile memory 804 is typically utilized by logic processor 802 to temporarily store information during processing of software instructions. Volatile memory 804 typically does not continue to store instructions when power is cut to the volatile memory.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 typically implemented in software by a processor to perform a particular function using portions of volatile memory, which function involves transformative processing that specially configures the processor to perform the function. Thus, a program may be instantiated via logic processor 802 executing instructions held by non-volatile storage device 806, using portions of volatile memory 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 808 may be used to present a visual representation of data held by non-volatile storage device 806, such as via a display device. As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision, depth data acquisition, and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides a method for determining a location of an active speaker, the method comprising: from an image capture device, receiving image data of a room in which the active speaker and at least one inactive speaker are located; using the image data, generating a three dimensional model of at least a portion of the room; from a first microphone array at the image capture device, receiving first audio data from the room; from a second microphone array that is laterally spaced from the image capture device, receiving second audio data from the room; using the three dimensional model, determining a location of the second microphone array with respect to the image capture device; using at least the first audio data, the second audio data, the location of the second microphone array, and an angular orientation of the second microphone array, determining an estimated location in the three dimensional model of the active speaker; using the estimated location of the active speaker to compute a setting for the image capture device; and outputting the setting to control the image capture device to highlight the active speaker. The method may additionally or optionally include, wherein the image capture device comprises a color camera and the image data comprises color image data. The method may additionally or optionally include, wherein the image capture device comprises a depth camera and the image data comprises depth data. The method may additionally or optionally include, wherein the image data comprises signals corresponding to light emitted from a plurality of light sources of the second microphone array, and the method further comprises using the signals to determine the angular orientation of the second microphone array with respect to the image capture device. The method may additionally or optionally include, wherein the plurality of light sources are illuminated in a spatially-recognizable manner. The method may additionally or optionally include receiving a signal from a magnetometer in the second microphone array; and using the magnetometer signal, determining the angular orientation of the second microphone array. The method may additionally or optionally include, determining that at least one of the first microphone array and the second microphone array has moved; and based on determining that at least one of the first microphone array and the second microphone array has moved, recomputing one or more of the location and the angular orientation of the second microphone array. The method may additionally or optionally include, wherein determining that at least one of the first microphone array and the second microphone array has moved comprises analyzing a signal received from or more of an accelerometer in the first microphone array, a magnetometer in the first microphone array, an accelerometer in the second microphone array, and a magnetometer in the second microphone array. The method may additionally or optionally include determining that the image data does not comprise image data of a plurality of light sources of the second microphone array; and outputting a notification indicating that the second microphone array is occluded from view of the image capture device.

Another aspect provides a video conferencing device, comprising: an image capture device for capturing image data of a room in which an active speaker and at least one inactive speaker are located; a first microphone array; a processor; and an active speaker location program executable by the processor, the active speaker location program configured to: using the image data, generate a three dimensional model of at least a portion of the room; receive first audio data of the room from the first microphone array; receive second audio data of the room from a second microphone array that is laterally spaced from the image capture device; using the three dimensional model, determine a location of the second microphone array with respect to the image capture device; using at least the first audio data, the second audio data, the location of the second microphone array, and an angular orientation of the second microphone array, determine an estimated three dimensional location of the active speaker; use the estimated location of the active speaker to compute a setting for the image capture device; and output the setting to control the image capture device to highlight the active speaker. The video conferencing device may additionally or alternatively include, wherein the image capture device comprises a color camera and the image data comprises color image data. The video conferencing device may additionally or alternatively include, wherein the image capture device comprises a depth camera and the image data comprises depth data. The video conferencing device may additionally or alternatively include, wherein the image data comprises signals corresponding to light emitted from a plurality of light sources of the second microphone array, and the active speaker location program is configured to determine the angular orientation of the second microphone array using the signals. The video conferencing device may additionally or alternatively include, wherein the plurality of light sources are illuminated in a spatially-recognizable manner. The video conferencing device may additionally or alternatively include, wherein the active speaker location program is configured to determine the angular orientation of the second microphone array using a signal received from a magnetometer in the second microphone array. The video conferencing device may additionally or alternatively include, wherein the active speaker location program is further configured to: determine that the second microphone array has moved from a first location to a second location; and based on determining that the second microphone array has moved, recompute one or more of the location and the angular orientation of the second microphone array. The video conferencing device may additionally or alternatively include, wherein determining that the second microphone array has moved comprises receiving a signal from an accelerometer in the second microphone array. The video conferencing device may additionally or alternatively include, wherein the active speaker location program is further configured to: determine that the image data does not comprise image data of a plurality of light sources of the second microphone array; and output a notification indicating that the second microphone array is occluded from view of the image capture device.

Another aspect provides a method for determining a location of an active speaker, the method comprising: from an image capture device, receiving image data of a room in which the active speaker and at least one inactive speaker are located; using the image data, generating a three dimensional model of at least a portion of the room; from a first microphone array at the image capture device, receiving first audio data from the room; from a second microphone array that is laterally spaced from the image capture device, receiving second audio data from the room; using the three dimensional model, determining a location of the second microphone array with respect to the image capture device; determining an angular orientation of the second microphone array with respect to the image capture device by receiving light emitted from a plurality of light sources of the second microphone array; using at least the first audio data, the second audio data, the location of the second microphone array, and the angular orientation of the second microphone array, determining an estimated three dimensional location of the active speaker; using the estimated location of the active speaker to compute a setting for the image capture device; and outputting the setting to control the image capture device to zoom into the active speaker. The method may additionally or optionally include receiving a signal from an accelerometer in the second microphone array; using the signal, determining that the second microphone array has experienced an acceleration; and based on determining that that the second microphone array has experienced an acceleration, recomputing the angular orientation of the second microphone array.

It is to be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for determining a location of an active participant, the method comprising:
   from an image capture device, receiving image data of a room in which the active participant and at least one inactive participant are located;
   from a first microphone array at the image capture device, receiving first audio data;
   from a second microphone array spaced from the image capture device, receiving second audio data;
   using a three dimensional model of at least a portion of the room, determining a location of the second microphone array; and
   using at least the first audio data, the second audio data, the location of the second microphone array, and an angular orientation of the second microphone array, determining an estimated location of the active participant.

2. The method of claim 1, further comprising:
   computing a setting for the image capture device based on at least the estimated location of the active participant; and
   outputting the setting to control the image capture device to highlight the active participant.

3. The method of claim 1, wherein the image capture device comprises a color camera and the image data comprises color image data.

4. The method of claim 1, wherein the image capture device comprises a depth camera and the image data comprises depth data.

5. The method of claim 1, wherein the image data comprises signals corresponding to light emitted from a plurality of light sources of the second microphone array, and the method further comprises using the signals to determine the angular orientation of the second microphone array with respect to the image capture device.

6. The method of claim 5, wherein the plurality of light sources are illuminated in a spatially-recognizable manner.

7. The method of claim 1, further comprising:
   receiving a signal from a magnetometer in the second microphone array; and
   using the magnetometer signal, determining the angular orientation of the second microphone array.

8. The method of claim 1, further comprising:
   determining that at least one of the first microphone array and the second microphone array has moved; and
   based on determining that at least one of the first microphone array and the second microphone array has moved, recomputing one or more of the location and the angular orientation of the second microphone array.

9. The method of claim 8, wherein determining that at least one of the first microphone array and the second microphone array has moved comprises analyzing a signal received from one or more of an accelerometer in the first microphone array, a magnetometer in the first microphone array, an accelerometer in the second microphone array, and a magnetometer in the second microphone array.

10. The method of claim 1, further comprising:
    determining that the image data does not comprise image data of a plurality of light sources of the second microphone array; and
    outputting a notification indicating that the second microphone array is occluded from view of the image capture device.

11. A video conferencing device, comprising:
    an image capture device for capturing image data of a room in which an active participant and at least one inactive participant are located;
    a first microphone array;
    a processor; and
    an active participant location program executable by the processor, the active participant location program configured to:
       receive first audio data from the first microphone array;
       receive second audio data from a second microphone array that is spaced from the image capture device;
       using a three dimensional model of at least a portion of the room, determine a location of the second microphone array; and
       using at least the first audio data, the second audio data, the location of the second microphone array, and an angular orientation of the second microphone array, determine an estimated location of the active participant.

12. The video conferencing device of claim 11, wherein the active participant location program is configured to:
    use at least the estimated location of the active participant to compute a setting for the image capture device; and
    output the setting to control the image capture device to highlight the active participant.

13. The video conferencing device of claim 11, wherein the image capture device comprises a color camera and the image data comprises color image data.

14. The video conferencing device of claim 11, wherein the image data comprises signals corresponding to light emitted from a plurality of light sources of the second microphone array, and the active participant location program is configured to determine the angular orientation of the second microphone array using the signals.

15. The video conferencing device of claim 14, wherein the plurality of light sources are illuminated in a spatially-recognizable manner.

16. The video conferencing device of claim 11, wherein the active participant location program is configured to determine the angular orientation of the second microphone array using a signal received from a magnetometer in the second microphone array.

17. The video conferencing device of claim 11, wherein the active participant location program is further configured to:

determine that the second microphone array has moved from a first location to a second location; and based on determining that the second microphone array has moved, recompute one or more of the location and the angular orientation of the second microphone array.

18. The video conferencing device of claim 17, wherein determining that the second microphone array has moved comprises receiving a signal from an accelerometer in the second microphone array.

19. The video conferencing device of claim 11, wherein the active participant location program is further configured to:

determine that the image data does not comprise image data of a plurality of light sources of the second microphone array; and output a notification indicating that the second microphone array is occluded from view of the image capture device.

20. A method for determining a location of an active participant, the method comprising:

from an image capture device, receiving image data of a room in which the active participant and at least one inactive participant are located;

from a first microphone array at the image capture device, receiving first audio data from the room;

from a second microphone array spaced from the image capture device, receiving second audio data;

using a three dimensional model of at least a portion of the room, determining a location of the second microphone array with respect to the image capture device;

determining an angular orientation of the second microphone array with respect to the image capture device by receiving light emitted from a plurality of light sources of the second microphone array;

using at least the first audio data, the second audio data, the location of the second microphone array, and the angular orientation of the second microphone array, determining an estimated three dimensional location of the active participant;

using the estimated location of the active participant to compute a setting for the image capture device; and outputting the setting to control the image capture device to zoom into the active participant.

* * * * *